United States Patent Office

3,155,575
Patented Nov. 3, 1964

3,155,575
COMPOSITION FOR INHIBITING PEPSIN ACTIVITY AND METHOD OF PREPARING SAME
John Doczi, Morristown, Fred C. Ninger, Livingston, and Harold I. Silverman, West Orange, N.J., assignors to Warner-Lambert Pharmaceutical Company, Morris Plains, N.J., a corporation of Delaware
No Drawing. Filed Dec. 16, 1960, Ser. No. 76,143
4 Claims. (Cl. 167—55)

The present invention relates to a new and novel preparation for the treatment of gastrointestinal disturbances and more particularly to a method for producing such a preparation in which an acid salt of chitosan and sodium aluminate are reacted in aqueous suspension.

In view of the prevalence of various gastrointestinal disorders, including gastric ulcer, there has over the years been a large effort directed towards finding suitable therapeutic agents for treatment of such conditions and for alleviating the symptoms associated therewith. Extensive pharmacological investigation, confirmed by studies of humans, has shown that such gastrointestinal disorders, including gastric ulcers, result from physical and/or chemical irritation of the stomach mucosa by excessive secretion of hydrochloric acid during the digestion process, and/or by irritating substances present in certain foods and/or by the peptic activity of gastric secretions.

Generally the site of such attack is an area of the stomach in which the natural protective layers have been broken. Although the cause of such a weakening of these protective layers is not known, the result is that the stomach mucosa is directly susceptible to attack and irritation as described above.

It is generally recognized that when the natural protective layers have been weakened, these areas must be protected from attack in order to permit natural healing. Proper control of diet can insure that irritating substances are not present in ingested foods. Beyond this, therapeutic agents which are capable of reducing the free acidity of the stomach contents and of forming a protective coating on the stomach mucosa are administered. Such conventional agents normally include various basic substances which can neutralize free hydrochloric acid within the stomach. This serves the double purpose of reducing the concentration of irritating acids within the stomach and also of raising the pH of the stomach contents to a value at which the activity of pepsin in the gastric secretions is at least reduced, nullified or even destroyed.

There has long been a need for a preparation which not only has an effective degree of acid binding capacity and an ability to form a protective layer over the stomach mucosa, but which also directly inhibits pepsin activity, above and beyond its effect on the pH of the stomach contents.

It is a primary object of this invention to provide a preparation useful in the treatment of gastrointestinal disturbances.

Another object of this invention is to provide a preparation which not only has the ability to neutralize free acidity in the stomach and to form a protective layer on the walls thereof, but also possesses a high degree of inhibitory action upon pepsin activity in gastric secretions.

Yet another object of this invention is to provide a method of preparing a composition useful in the treatment of gastrointestinal disturbances.

Other objects and the advantages of this invention will become apparent from the following detailed description.

It has now been found that an efficient antacid capable of effectively nullifying pepsin activity is obtained by adding sodium aluminate to an aqueous solution of an acid salt of chitosan and recovering the resulting precipitate which forms.

The material chitosan is a well known amino-polysaccharide having a structure which is generally recognized as being a long chain of polymerized units of the aminosugar, glucosamine. Chitosan is derived from the material chitin which occurs in the shells of various crustacea, such as crab shells, lobster shells and the like and may be obtained therefrom by an extraction process, for example by treatment with soda ash. In chitin the nitrogen atoms present in each glucosamine unit are acetylated. The name chitosan refers to N-deacetylated chitin which is available in a wide range of molecular weights. In accordance with techniques of the prior art chitin may be deacetylated by treatment with acids, by the action of enzymes such as chitinase found in the snail intestine, or by treatment with alkali. For example, U.S. Patent 2,040,879 describes the preparation of N-deacetylated chitin or chitosan by treatment of shrimp, lobster or crab shells with soda ash to extract chitin therefrom, followed by a treatment of the chitin with 40 percent sodium hydroxide under a nitrogen atmosphere. It is to be understood that in the present specification and in the accompanying claims the use of the term "chitosan" is meant to include within its scope any partially or totally deacetylated chitin.

In accordance with the method of the present invention, chitosan is first converted to an acid salt by stirring its aqueous suspension with sufficient acid to obtain a clear solution. Satisfactory solubility is achieved when hydrochloric acid, for example, is employed. To the solution obtained, which will normally have a pH of between about 2.5 and about 3, is then added sodium aluminate, either in solid form or, preferably, in aqueous solution. It is generally preferred that the sodium aluminate be added in small portions or increments with the addition being accompanied by vigorous agitation of the reaction mixture.

The temperature at which the reaction is carried out is not critical and the reaction mixture may conveniently be maintained at about room temperature. A sufficient quantity of sodium aluminate is added so that the pH of the reaction mixture after equilibrium has been reached will be between about 6.5 and about 12 and preferably between 7.0 and 9.0. Such a pH insures maximum yield of material which in aqueous suspension has a pH of such a value as to result in an effective neutralization of hydrochloric acid under the pH conditions normally present in the stomach.

The precipitate which is formed during and at the conclusion of the intermittent addition of sodium aluminate constitutes a combination of chitosan and an aluminum compound, the combination containing about 8 to about 11 percent aluminum. The precipitate is strained through fabric bags to remove a large portion of the water and is washed several times with water to remove any soluble salts. For use, the chitosan-aluminum combination, in either a wet state after washing or in dry form, if it is subsequently dried may then be suspended in water or other acceptable medium preferably in a concentration of from about 1 to about 5 percent by weight. Alternately, the precipitate after drying may be compressed into tablet form employing suitable lubricants and other conventional excipients, with each tablet containing from about 10 to about 150 milligrams of the novel combination.

The following example is included in order further to illustrate the present invention:

EXAMPLE

Chitosan is boiled three times with water to remove any water soluble impurities and the solids remaining are then washed with acetone and dried. 100 grams of the washed and dried chitosan thus obtained are suspended in three liters of water. To this suspension are added 45 ml. of concentrated HCl and the mixture then stirred until the chitosan has gone into solution. The chitosan hydrochloride solution thus formed has a pH of 2.7.

740 ml. of an aqueous solution of sodium aluminate (containing 62.5 grams sodium aluminate per liter of water) are added gradually to the chitosan hydrochloride solution over a period of about one hour with constant agitation of the mixture. A voluminous gelatinous precipitate forms during the addition and the final pH of the mixture is 7.5.

The reaction mixture is strained through bags having 80 openings per square inch to separate the aqueous phase from the gelatinous precipitate and the bags are squeezed until the wet gelatinous mass has a solids content of about 10 percent. The resulting wet mass is spread in trays and dried in an oven for four days at 40° C. 131 grams of a chitosan-aluminum combination containing 10 percent by weight of aluminum is obtained.

When the resulting combination is suspended in water to form a suspension containing 3.5 percent by weight of the combination a therapeutic composition useful in the treatment of gastrointestinal disorders is obtained.

The effectiveness of any composition in controlling the parameters generally associated with gastrointestinal disturbances, including gastric ulcer, may be readily evaluated in laboratory animals to determine the ability of the composition to reduce the amount of free hydrochloric acid present in the stomach contents, to decrease the peptic activity of gastric secretions and to form a protective coating on the stomach mucosa. These tests are all carried out in vivo using rats in which the pylorus has been ligated according to the procedure described by Shay, H., et al., Gastroenterology 5:43 (1946).

In the test for the ability of the composition to reduce the free acidity of the stomach, varying amounts of the composition in question are administered by stomach tube immediately after a ligature has been placed around the pylorus of each animal. At the end of four hours, the animals are sacrificed, the stomach contents collected and titrated with standard alkali to determine the amount of free acid present. The $ED_{50}$ value for the composition is the amount, expressed in milligrams per kilogram of body weight, required to reduce the free acidity of the stomach contents in the above described test to 50 percent of the corresponding values found in pyloric ligated but untreated control animals.

The test for anti-peptic activity also involves the use of pyloric ligated rats and a test period of four hours after administration by stomach tube of the composition to be tested. The test depends on the rate at which the stomach contents degrade a standard protein, for example, hemoglobin, which is digested by pepsin to form tyrosine. The quantity of tyrosine liberated in a given time and under controlled conditions is proportional to the amount of free or unbound pepsin present in the gastric contents. The rationale of this test and its procedure are described by Glass, G. B. J., et al., The Rev. of Gastroenterology, 18, 670 (1951). The $ED_{50}$ value for the composition being tested is the amount, in milligrams per kilogram of body weight, required to reduce the amount of tyrosine liberated in the test in a given time and under standard conditions to one-half the amount liberated when the test is applied to the stomach contents of pyloric ligated but untreated control animals.

The test for the ability of a composition to form a protective coating on the stomach mucosa, that is, its demulcent capability, is also carried out in pyloric ligated rats. As soon as a ligature has been applied around the pylorus, a quantity of one-half gram of aspirin per kilogram of body weight is placed in the stomach and the composition to be tested is immediately administered by stomach tube. The purpose of the aspirin is to create an irritation of the stomach mucosa. In this test a five hour period is employed and at the end of this time the stomach mucosa of the sacrificed animal is examined and graded on the following empirical scale:

0—no irritation
    1—minor irritation
    2—minor ulceration
    3—severe ulceration It has been found in testing a large number of pyloric ligated control animals to which aspirin has been administered as described above but which are otherwise untreated that the average score per animal is between 2.25 and 2.5. The $ED_{50}$ value is the amount of the composition being tested, expressed in milligrams per kilogram of body weight, required to reduce the average score per treated animal to 50 percent of the values obtained in untreated control animals.

The following table presents the results of each of the above described tests as applied to a chitosan-aluminum combination prepared as described in the example. The combination is administered to the animals as a 3.5 percent by weight aqueous suspension. The $ED_{50}$ values in Column A represent the milligrams of the combination (expressed as solid) per kilogram of body weight in each test. For comparative purposes, the $ED_{50}$ values in the same tests are included in Column B for a well-known preparation for treatment of gastrointestinal disturbances having the following composition:

| | Percent by weight |
|---|---|
| Aluminum hydroxide | 22.0 |
| Magnesium trisilicate | 41.5 |
| Sugar (with 3% starch) | 32.4 |
| Corn starch | 3.9 |
| Calcium phosphate | 0.2 |
| | 100.0 |

*Table*

[$ED_{50}$, mg./kg.]

| | A | B |
|---|---|---|
| Reduction of Free Acidity | 1,150 | 840 |
| Inhibition of Pepsin Activity | 175 | 760 |
| Demulcent Capability | 560 | 360 |

The results presented in the table establish that the composition of the example prepared in accordance with this invention has significant acid neutralization and demulcent activity, although somewhat lower than the corresponding activities for the presently available composition comprising aluminum hydroxide and magnesium trisilicate. In the area of inhibition of pepsin activity, however, the composition of this invention is more than four times as effective as the aluminum hydroxide-magnesium trisilicate composition.

It is understood that the foregoing detailed description is given merely by way of illustration and that many variations may be made therein without departing from the spirit of our invention.

Having described our invention, what we desire to secure by Letters Patent is:

1. A method of preparing a composition capable of inhibiting pepsin activity which comprises treating an aqueous solution of an acid salt of chitosan at a pH range of from about 2.5 to about 3 with sufficient sodium aluminate to bring the pH range of about 6.5 to 12 and recovering the precipitate which forms.

2. A method of preparing a composition capable of inhibiting pepsin activity which comprises adding sodium aluminate to an aqueous solution of chitosan hydrochloride in an amount sufficient to raise the pH of the resulting suspension to between about 6.5 and about 12 and recovering the precipitate which forms.

3. A method of preparing a composition capable of inhibiting pepsin activity which comprises adding successive portions of an aqueous solution of sodium aluminate to an aqueous solution of chitosan hydrochloride in an amount sufficient to raise the pH of the resulting suspension to between pH 7 and pH 9 and recovering the precipitate which forms.

4. A composition prepared by the process of claim 1.

References Cited in the file of this patent

UNITED STATES PATENTS 2,970,889  Ishimo et al. ------------ Feb. 7, 1961

FOREIGN PATENTS 125,988  Sweden ---------------- Sept. 6, 1949